3,842,096
PROCESS FOR PREPARING 2-IMINO-
1,3-DITHIETANES
William W. Brand and Milon Walker Bullock, Hopewell,
N.J., assignors to American Cyanamid Company, Stamford, Conn.
No Drawing. Filed Feb. 28, 1973, Ser. No. 336,644
Int. Cl. C07d 69/00
U.S. Cl. 260—327 M   4 Claims

ABSTRACT OF THE DISCLOSURE

There is provided a one-step process for the synthesis of aromatic 2-imino-1,3-dithietanes from aryl isocyanide dichlorides or aryl isothiocyanates by:

(1) Reacting a mixture of either an aryl isothiocyanate or an aryl isocyanide dichloride, methylene bromide, and if needed, an appropriate base such as triethylamine in a solvent, with a sulfide source such as hydrogen sulfide, ammonium sulfide, sodium sulfide, or potassium hydrosulfide, or (2) Carrying out the reaction by the sequential addition of either the aryl isocyanide dichloride or aryl isothiocyanate to a solution or suspension of the aforementioned sulfide, followed by admixture with methylene bromide.

---

The present invention relates to a novel process for the preparation of aromatic 2-imino-1,3-dithietanes having the formula:

[I]

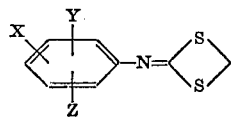

wherein X, Y and Z each represents a member selected from the group consisting of hydrogen, halogen, $R(A)_n$, hydroxy, phenyl, phenoxy, monohalophenoxy, nitro, trihalomethyl, cyano, carb(lower)alkoxy $C_1$–$C_4$, $R_1S(O)_m$, di(lower)alkylamino, mono(lower)-alkylamino, 1,3-dithietanylideneamino; R is alkyl $C_1$–$C_8$, alkenyl $C_3$–$C_8$, alkynyl $C_3$–$C_8$; A is O or S; $n$ is an integer selected from 0 and 1; $R_1$ is loweralkyl $C_1$–$C_4$; $m$ is an integer selected from 1 and 2, and when two of X, Y and Z are taken together on adjacent carbons, they may from a benzo group.

In accordance with the process of this invention, the above-named compounds can be prepared by a straightforward one-step process from either aryl isocyanide dichlorides or aryl isothiocyanates, thereby eliminating the necessity of isolation and purification of intermediates. One such procedure involves the addition of a sulfide source represented by the formula $H_a'SM(2-a')$, wherein $a'$ is an integer selected from 0, 1 and 2; M is an alkali metal, ammonium or primary-, secondary-, tertiary- or quaternary-alkyl($C_1$–$C_4$)ammonium group such as aqueous ammonium sulfide, sodium sulfide, potassium hydrosulfide or hydrogen sulfide to a solution of methylene bromide, an appropriate base, if needed, and the isocyanide dichloride or isothiocyanate. If $a'$ is 0 in the sulfide, no additional base is needed; if $a'=1$, one equivalent of base is needed per equivalent of sulfide; and if $a'$ is 2, two equivalents of base are needed per equivalent of sulfide.

In general, any common base can be used, as for example, alkali metal hydroxides, alkali metal bicarbonates, alkali metal carbonates, or preferably tertiary-alkyl ($C_1$–$C_4$)amines. Preferably, 1.5 to 3 equivalents of methylene bromide to each equivalent of aryl isothiocyanate or isocyanide dichloride are employed. If the reaction is carried out starting with an isothiocyanate, 1 to 2 equivalents of sulfide are used. Utilizing an isocyanide dichloride as the starting material, 2 to 3 equivalents of sulfide are used. The reaction can be run at temperatures between 0° C. and 60° C., and preferably at temperatures from 20° C. to 40° C. The solvent used can be any polar aprotic solvent or aqueous mixture of an organic solvent which is inert to the reactants, such as water, pyridine, sulfolane, ethylene glycol dimethyl ether, diethylene glycol dimethyl ether, esters of lower alkanols, an aqueous mixture of one of these, or preferably acetonitrile, aqueous acetonitrile, dimethyl sulfoxide (DMSO), aqueous DMSO, dimethylformamide (DMF), aqueous DMF, lower alkyl $C_1$–$C_4$ ketones, or aqueous lower alkyl $C_1$–$C_4$ ketones.

An alternative procedure involves the sequential addition to a solution or suspension of the sulfide, and base where needed, of the isocyanide dichloride or isothiocyanate, followed by methylene bromide. The sulfide and base, may also be added to a solution of the isothiocyanate or isocyanide dichloride, followed by addition of methylene bromide. The same requirements on stoichiometry, reaction temperatures, reagents, and solvents apply to this modification as specified for the procedures outlined above.

Advantageously, the compounds prepared by the process of this invention have utility as ovicidal and larvicidal agents for insects and acarina. They may also be employed as chemosterilants for Ixodides and can be used to suppress fecundity thereof. As ovicidal agents and larvicidal agents, the active compounds may be brought into contact with the larvae and/or eggs of insects and acarina in the form of dilute solid or liquid formulations.

Similarly, control of Ixodides is achieved by applying the dithietanes of Formula I above to the adult females. Application can be made directly or indirectly. It is generally effected by topically applying the active ingredients; namely, the dithietanes of Formula I, onto the host to be protected or the habitat of the Ixodide. This method of control is useful against Argasidae or Ixodidae ticks including, for example, those of the following types: Boophilus, Amblyomma, Anocentor, Dermacentor, Ixodes, Haemaphysalis, Hyalomma, Rhipicephalus, Argas, Otobius and Ornithodoros.

Application is generally facilitated by employing a composition containing an effective amount of the dithietane in combination with an inert agricultural adjuvant. One or more of the conventional solid and liquid carriers, diluents and formulation aids may be employed as the adjuvant. Furthermore, in addition to employing a single dithietane as the active ingredient, several of the Formula I dithietanes or one or more of the dithietanes in combination with a conventional pesticide may be employed.

The dithietanes may be conveniently formulated as dusts, dust concentrates, wettable powders, emulsifiable concentrates and the like. Application thereof is made in conventional manners such as by spraying, dusting, dipping in baths and the like.

The preparation of the dithietanes employed in the present invention and their chemosterilant effect in Ixodides is demonstrated in the examples which follow, which are not to be taken as being limitative of the present invention.

EXAMPLE 1

Preparation of 4-chloro-o-tolylimino-1,3-dithietane

Into an ice water cooled flask containing 20 ml. of dimethylsulfoxide (DMSO) are added 16 ml. (0.05 mole) of 21% aqueous ammonium sulfide. To the resulting mixture is added 4.45 grams (0.02 mole) of 4-chloro-o-tolyl-isocyanide dichloride over 10 minutes with stirring. The temperature is kept below 20° C. by use of the ice water bath. The resulting mixture is stirred at 20° C. for 15 minutes. To the latter is then added 2.8 ml. (0.04 mole) of methylene bromide dropwise during 15 minutes, keeping the temperature below 20° C. The resultant reaction mixture is stirred at room temperature for one and one-half hours. It is then poured into water and extracted with three 30 ml. portions of ether. The ether extract is washed with water and with saturated sodium chloride, dried, and evaporated, yielding 6.0 grams of crude yellow product. There is obtained, on analysis, a 60% yield of product.

4.85 Grams of the latter product is dissolved in 24 ml. of acetone, and stirred with 1.6 ml. of concentrated HCl. The precipitate is filtered off and washed with acetone and ether. The resulting 2.42 grams of white powder is stirred with approximately 20 ml. of ether and 20 ml. of water until all solids have dissolved. The layers are then separated and the organic layer washed with saturated sodium chloride and dried. The solvent is evaporated. A 52.5% yield of the dithietane as a white solid is obtained.

EXAMPLE 2

Preparation of 2-bromo-p-tolylimino-1,3-dithietane

The procedure of Example 1 is followed in every detail employing 2-bromo-p-tolylisocyanide dichloride in lieu of 4-chloro-o-tolylisocyanide dichloride. There is obtained a 69.4% yield of the above-named dithietane having a melting point ranging from 69° C. to 72.5° C.

EXAMPLE 3

Preparation of 2-bromo-p-tolylimino-1,3-dithietane

Repeating Example 2 in every detail except that acetone is employed in lieu of DMSO, a 51% yield of the dithietane is obtained.

EXAMPLE 4

Preparation of phenylimino-1,3-dithietane

To a solution of 1.3 ml. (0.01 mole) of phenylisocyanide dichloride and 1.4 ml. (0.02 mole) of methylene bromide in 20 ml. of DMSO are added dropwise over about 15 minutes with stirring 8.4 ml. (0.03 mole) of 24% aqueous ammonium sulfide. An ice bath is used to keep the reaction temperature below 40° C. The resulting reaction mixture is stirred at room temperature for one hour. It is then poured into water and worked up as in Example 1, yielding 1.39 grams (77% yield) of the hydrochloride salt as a white solid. The product is next hydrolyzed to phenylimino-1,3-dithietane, as is shown in Example 1 above.

EXAMPLE 5

Preparation of 4-chloro-o-tolylimino-1,3-dithietane

The procedure of Example 1 is repeated in every detail except there is substituted 4-chloro-o-tolylisothiocyanate for 4-chloro-o-tolylisocyanide dichloride, and 1.5 mole of ammonium sulfide per mole of 4-chloro-o-tolylisothiocyanate is used. There results a 45% yield of the dithietane.

EXAMPLE 6

Preparation of p-pyrrolidinylsulfonylphenylimino-1,3-dithietane

The procedure of Example 1 is followed in every detail except that p-pyrrolidinylsulfonylphenylisothiocyanate and 1.5 mole of ammonium sulfide per mole of the isothiocyanate are employed. There results a 32% yield of the 1,3-dithietane named above.

EXAMPLE 7

Preparation of 4-chloro-o-tolylimino-1,3-dithietane

Into a solution containing 1.84 grams (0.01 mole) of 4-chloro-o-tolylisothiocyanate, 1.4 ml. (0.02 mole) of methylene bromide and 2.8 ml. (0.02 mole) of triethylamine in 20 ml. of DMSO are slowly passed through hydrogen sulfide for about thirty minutes until the reaction mixture is saturated. The addition is discontinued, and the reaction mixture is stirred for an additional thirty minutes. The resultant mixture is then poured into water and worked up as in Example 1, yielding 1.32 grams (58% yield) of the dithietane.

EXAMPLE 8

Preparation of 4-chloro-o-tolylimino-1,3-dithietane

The procedure of Example 7 is repeated in every detail, but substituting 4-chloro-o-tolylisocyanide dichloride for the isothiocyanate, and using twice as much triethylamine. There is obtained a 29% yield of the dithietane.

EXAMPLES 9–67

A variety of diverse aryl isothiocyanates or aryl isocyanide dichloride are employed in the examples to prepare the corresponding 1,3-dithietanes presented in Table I below by following the procedures of Example I in every detail.

TABLE I

Aromatic 2-imino-1,3-dithietanes

| Example | X | Y | Z | Melting point, °C |
|---|---|---|---|---|
| 9 | 4—Cl— | H | H | 86.8–88 |
| 10 | 4—CH₃— | H | H | 54.5–55 |
| 11 | 4—C₂H₅— | H | H | Oil |
| 12 | 4-n-C₄H₉— | H | H | Oil |
| 13 | 4—(C₆H₄)—O— | H | H | 67.5–68.5 |
| 14 | 4—CH₃—O—C(O)— | H | H | 79–80 |
| 15 | 4-(CH₃)₂—N— | H | H | 96–98 |
| 16 | 3—C₇H₁₅O— | H | H | |
| 17 | 4-Cl—(C₆H₄)—O— | H | H | 58.5–59 |

TABLE I—Continued

| Example | X | Y | Z | Melting point, °C. |
|---|---|---|---|---|
| 18 | 4-(S-S ring)=N- | H | H | 220-223 |
| 19 | 3-CH$_3$- | H | H | 28.5-29.5 |
| 20 | 3-CF$_3$- | H | H | Oil |
| 21 | 3-C$_2$H$_5$O- | H | H | Oil |
| 22 | 3-Cl- | H | H | 76-77 |
| 23 | 3-Br- | H | H | 67.5-69.5 |
| 24 | 3-(C$_6$H$_5$)-O- | H | H | Oil |
| 25 | 3-CH$_3$-S- | H | H | Oil |
| 26 | 3-C$_2$H$_5$COO- | H | H | 62.5-63.5 |
| 27 | 2-CH$_3$- | H | H | 34-35 |
| 28 | 2-Cl- | 3-Cl- | H | 77-79 |
| 29 | 2-CH$_3$- | 3-Cl- | H | 80-81.5 |
| 30 | 2-CH$_3$- | 4-CH$_3$- | H | Oil |
| 31 | 2-Cl- | 4-Cl- | H | 95-97 |
| 32 | 2-CH$_3$ | 4-Br- | H | Oil |
| 33 | 2-Cl- | 4-NO$_2$- | H | 103-104 |
| 34 | 2-CH$_3$- | 5-C$_3$H$_7$-i- | H | Oil |
| 35 | 2-Cl- | 5-Cl- | H | 98-99 |
| 36 | 2-C$_2$H$_5$- | 6-C$_2$H$_5$- | H | 56-57 |
| 37 | 3-CH$_3$- | 4-CH$_3$- | H | Oil |
| 38 | 3-Cl- | 4-CH$_3$- | H | 80-80.5 |
| 39 | 3-Cl- | 4-Cl- | H | 100-101.5 |
| 40 | 3-CF$_3$- | 4-Cl- | H | Oil |
| 41 | 3-Cl- | 5-Cl- | H | 106-108 |
| 42 | 2-Cl- | 4-Cl- | 5-Cl- | 96.5-98.5 |
| 43 | 2-CH$_3$ | 4-CH$_3$- | 5-CH$_3$- | 41-42 |
| 44 | 3-Cl- | 4-CH$_3$O- | 6-CH$_3$O- | 104.5-106 |
| 45 | 4-OH- | H | H | 162-163 |
| 46 | 4-CH$_3$S- | H | H | 76-77.5 |
| 47 | 4-F- | H | H | 59-60 |
| 48 | 4-I- | H | H | 139.5-141 |
| 49 | 4-CH$_3$O- | H | H | 37.5-38.5 |
| 50 | 4-CN- | H | H | 78.5-79.5 |
| 51 | 4-NO$_2$- | H | H | 135-137 |
| 52 | 3-CN- | H | H | 114-115 |
| 53 | 2-Cl- | H | H | 42.5-44 |
| 54 | 2-CH$_3$O- | H | H | 112-114 |
| 55 | 2-Cl- | 4-CH$_3$- | H | 67.5-70.5 |
| 56 | 2-CH$_3$- | 4-NO$_2$- | H | 128.5-130.5 |
| 57 | 2-CH$_3$- | 5-CH$_3$- | H | 33-34 |
| 58 | 3-CH$_3$- | 4-Br- | H | 71-73 |
| 59 | 3-CH$_3$O- | 4-CH$_3$O- | H | 82.5-83.5 |
| 60 | 2,3-benzo | | H | 103-105 |
| 61 | 2-CH$_2$=CHCH$_2$- | H | H | |
| 62 | 4-HC≡CCH$_2$O- | H | H | |
| 63 | 3-C$_5$H$_9$- | H | H | |
| 64 | 4-C$_6$H$_{11}$- | H | H | |
| 65 | 3-CH$_2$=CCH$_3$CH$_2$S- | H | H | |
| 66 | 4-C$_7$H$_{13}$O- | H | H | |
| 67 | 4-CH$_2$=CHCH$_2$- | 2-Cl- | H | |

EXAMPLE 68

Efficacy of the dithietanes as chemosterilants for Ixodides is demonstrated in the following tests, wherein adult female *Boophilus microplus* ticks which have dropped from cattle are collected and used for testing. The compound to be tested is dissolved in a 35% acetone/65% water mixture in sufficient amount to provide from about 500 p.p.m. to 2000 p.p.m. of compound in the test solution. Ten ticks per treatment are used and they are immersed in test solution for 3 to 5 minutes. Thereafter, they are removed and placed in cages and held at room temperature for 3 days. Counts of ticks laying eggs are then made and recorded. For these tests, non-resistant ticks as well as ethion-resistant and dioxathion-resistant ticks are used since the latter two are among the most difficult of their kind to control. Results of these tests are given in Table II below. The rating system used is as follows:

Rating System

+ = 50% did not lay eggs when treated at 2000 p.p.m.
++ = 50% did not lay eggs when treated at 1000 p.p.m.
+++ = 50% did not lay eggs when treated at 500 p.p.m.
O = more than 50% layed eggs when treated at 2000 p.p.m.
M = ethion-resistant ticks
D = dioxathion-resistant ticks
S = non-resistant

TABLE II

| Compound Example No. | M | D | S |
|---|---|---|---|
| 10 | + | + | ++ |
| 12 | 0 | + | + |
| 13 | + | 0 | + |
| 14 | 0 | 0 | + |
| 21 | 0 | 0 | + |
| 27 | ++ | ++ | +++ |
| 53 | 0 | + | + |
| 54 | + | + | ++ |
| 28 | ++ | ++ | +++ |
| 29 | +++ | ++ | +++ |
| 1 | ++ | ++ | +++ |
| 30 | ++ | ++ | +++ |
| 31 | ++ | ++ | ++ |
| 32 | ++ | + | ++ |
| 2 | 0 | + | +++ |
| 55 | 0 | + | +++ |
| 33 | + | 0 | 0 |
| 34 | 0 | + | + |
| 57 | ++ | ++ | +++ |
| 36 | + | + | + |
| 37 | 0 | + | + |
| 38 | ++ | 0 | ++ |
| 58 | + | + | ++ |
| 43 | ++ | ++ | +++ |
| 60 | ++ | ++ | ++ |

We claim:
1. A process for the preparation of a compound having the formula:

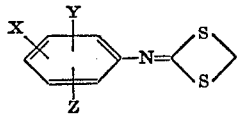

wherein X, Y and Z each represent a member selected from the group consisting of hydrogen, halogen, $R(A)_m$, hydroxy, phenyl, phenoxy, monohalophenoxy, nitro, trihalomethyl, cyano, carb(lower)alkoxy $C_1$–$C_4$, $R_1S(O)_m$, di(lower)alkylamino, mono(lower)alkylamino, 1,3-dithietanylideneamino; R is alkyl $C_3$–$C_8$, alkenyl $C_3$–$C_8$; A is O or S; $n$ is an integer selected from 0 and 1; $R_1$ is lower alkyl $C_1$–$C_4$; $m$ is an integer selected from 1 and 2, and when two of X, Y and Z are taken together on adjacent carbons, they form a benzo group which comprises the steps of: reacting at a temperature ranging from 0° C. to 60° C. a compound having the formula:

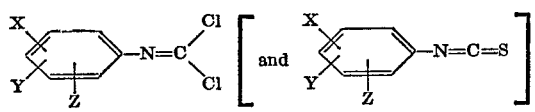

wherein X, Y and Z are as defined above, with a sulfide having the formula: $H_a'SM_{(2-a')}$, wherein $a'$ represents an integer selected from the group consisting of 0, 1 and 2; M represents a radical selected from the group consisting of an alkali metal, ammonium and a primary-, secondary-, tertiary- and quaternary-alkyl ($C_1$–$C_4$) ammonium, in the presence of or subsequent addition to from 1.0 to 3.0 equivalents of methylene bromide, and a base selected from the group consisting of an alkali metal hydroxide, an alkali metal carbonate, an alkali metal bicarbonate, ammonia and a $C_1$–$C_4$ alkylamine in a polar aprotic solvent or a mixture of water and said polar aprotic solvent, the solvent being selected from the group consisting of pyridine, dimethylsulfoxide, dimethylformamide, acetonitrile, a lower alkyl ($C_1$–$C_4$) aliphatic ketone, ethylene glycol dimethyl ether, sulfolane and an esterified lower alkanol and wherein the number of equivalents of said base relative to said sulfide equals at least the equivalents of hydrogen, $a'$, in the said sulfide reactant.

2. The process according to claim 1, in which the sulfide source is added to a mixture of all the other reagents.

3. The process according to claim 2, in which the sulfide source is aqueous ammonium sulfide, the solvent selected from the group consisting of dimethylsulfoxide, dimethylformamide and acetone, and the reaction is carried out at a temperature of from 20° C. to 40° C.

4. The process according to claim 3, in which 2 to 3 equivalents of sulfide are used.

References Cited
UNITED STATES PATENTS 3,470,207   9/1969   Addor _____ 260—327 M
3,484,455   12/1969  Addor _____ 260—327 M

OTHER REFERENCES

Neidlein et al., Chemical Abstracts, vol. 68, abst. 39266v (1968).

JOHN D. RANDOLPH, Primary Examiner

U.S. Cl. X.R.
424—277